F. W. POMROY.

Improvement in Metal Turning Lathes.

No. 130,387. Patented Aug. 13, 1872.

Witnesses: A. W. Hardy, George Edgar

Inventor: Francis W. Pomroy

F. W. POMROY.
Improvement in Metal Turning Lathes.
No. 130,387.
2 Sheets--Sheet 2.
Patented Aug. 13, 1872.
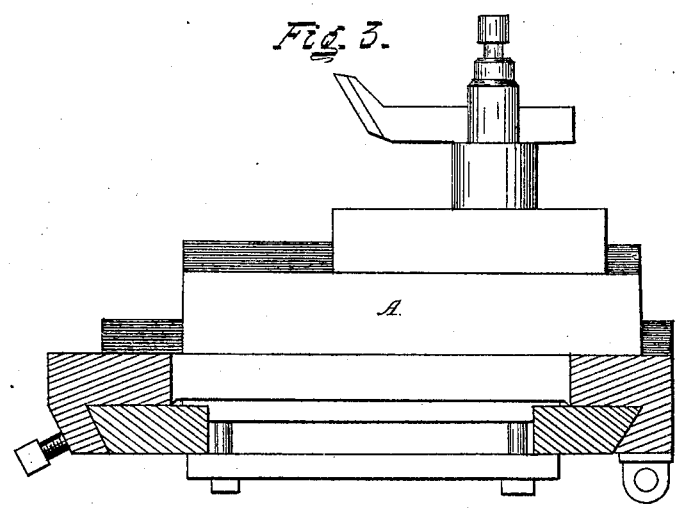
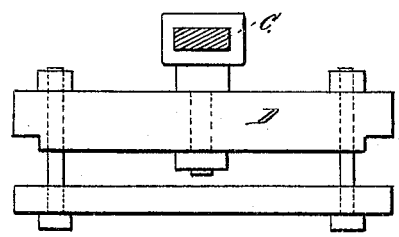
Witnesses.
Inventor.

UNITED STATES PATENT OFFICE.

FRANCIS W. POMROY, OF SANDUSKY, OHIO.

IMPROVEMENT IN METAL-TURNING LATHES.

Specification forming part of Letters Patent No. 130,387, dated August 13, 1872.

SPECIFICATION.

Specification describing certain Improvements in Engine-Lathes for boring and turning tapers, by FRANCIS W. POMROY, of the city of Sandusky, in the county of Erie and State of Ohio.

My invention relates to an additional slide on the T-rest of an ordinary engine-lathe, to adapt said lathe to the turning of tapered objects. The tool-rest and its slide are placed on the top of the additional slide, and by means of a guide-bar, when the lathe is operated, the taper is formed.

Figure 1:
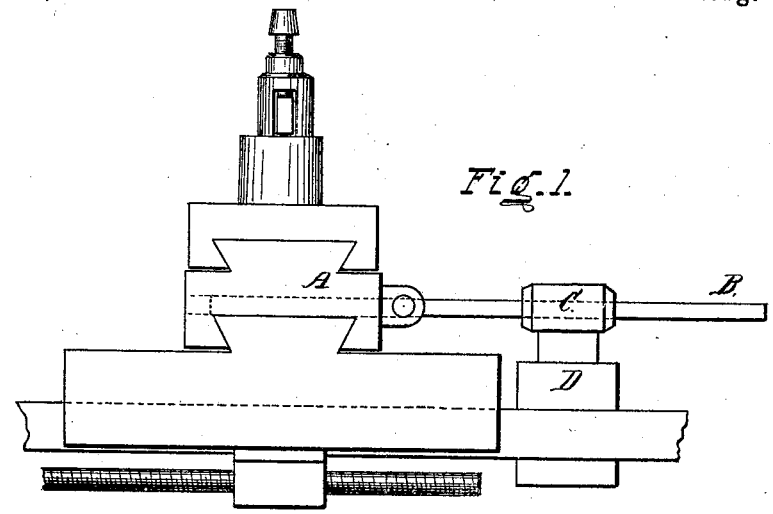
Figure 2:
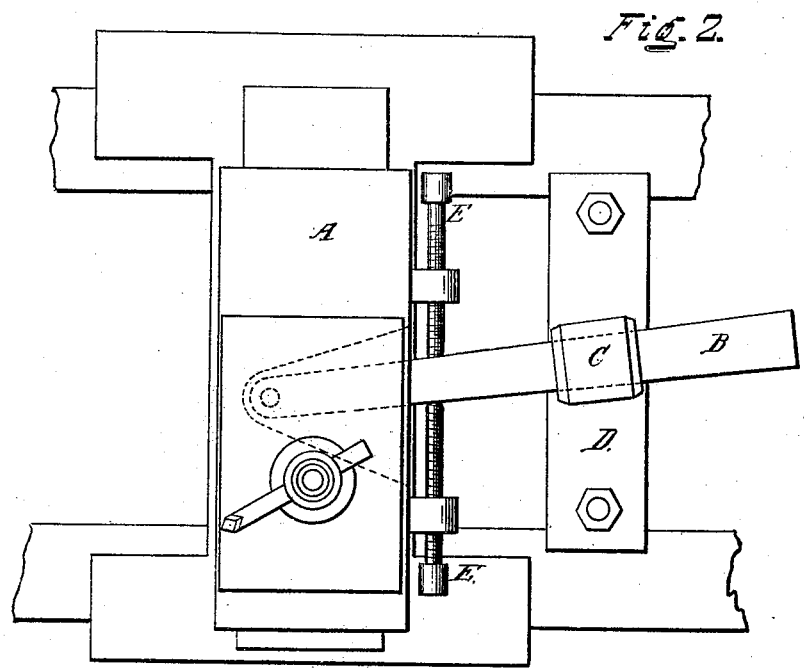

Figure 1, front view; Fig. 2, plan of the same; Fig. 3, sectional view of the same; Fig. 4, cross-bar and slotted head.

A, the additional slide on the T-rest, and on which is placed the upper slide and tool-stand, which, when the lathe is operated, are carried transversely across the lathe by the lever or guide-bar B, according to the angle at which the bar is set, forming the required taper; B, the lever or guide-bar which passes through the slotted head, the other end working on a pivot in the additional slide A; C, slotted head pivoted in the cross-bar D or its equivalent; D, adjustable cross-bar securely fastened to the lathe-bed or its equivalent; E E, set-screws holding the lever or guide-bar B in the required position.

I make no claim to the T-rest or upper slide and tool-rest, for I am aware that they are not new; but

I claim as my invention—

The combination of the slide A, guide-bar B, cross-head D, slotted head C, and set-screws E, substantially as herein described.

FRANCIS W. POMROY.

Witnesses:
A. W. HENDRY,
CHAS. CROSS.